Dec. 12, 1961 M. MENDELSOHN ET AL 3,013,100
DIAPHRAGM FOR ELECTROLYTIC PROCESSES AND
METHOD OF MAKING SAME
Filed May 2, 1957
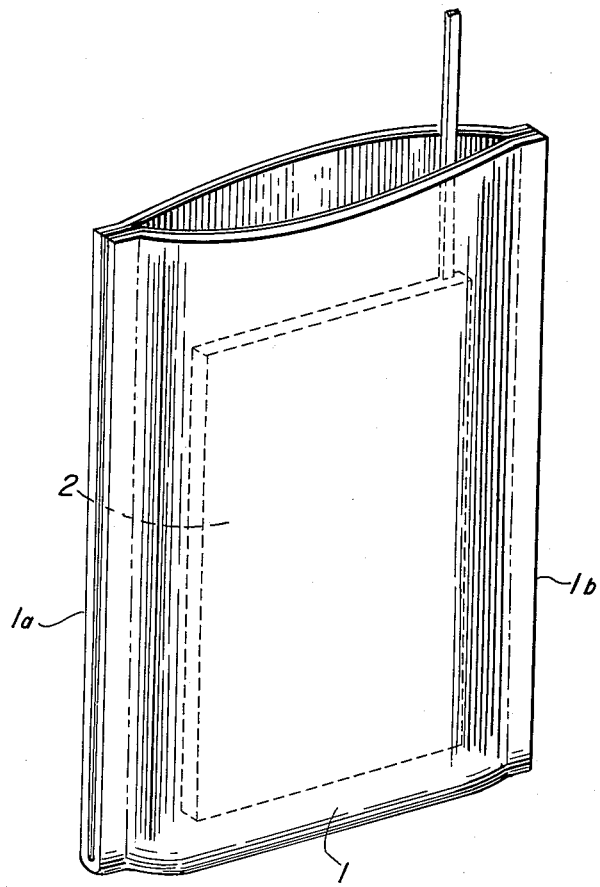
INVENTORS:
MEYER MENDELSOHN
FRANK SOLOMON
BY
Karl F. Ross
AGENT

3,013,100
DIAPHRAGM FOR ELECTROLYTIC PROCESSES AND METHOD OF MAKING SAME

Meyer Mendelsohn, New York, and Frank Solomon, Lake Success, N.Y., assignors, by mesne assignments, to Yardney International Corp., New York, N.Y., a corporation of New York
Filed May 2, 1957, Ser. No. 656,704
9 Claims. (Cl. 136—146)

This invention relates to electrolyte-permeable diaphragms used as anode bags, inter-electrode separators or spacers used in electrochemical cells. More particularly it relates to semi-permeable spacers of cellulosic and other materials and has for one of its principal objects the provision of a process for making such diaphragms mechanically strong and chemically resistant to attack by oxidizers and alkalis.

It is a more specific object of this invention to provide a process enabling the effective penetration of a semi-permeable cellulosic sheet material by a protective film-forming agent.

Another object is to provide a treatment capable of rendering permeable materials semi-permeable, thus of controlling the porosity of such materials in a manner enabling their use as inter-electrode separators for the cells of rechargeable batteries.

A further object of this invention is to provide a heat-sealable cellulosic diaphragm by utilizing the thermal fusibility of polyvinyl alcohol applied as an impregnant to such diaphragm.

A principal feature of this invention is the production of an inter-electrode spacer by the coating of a pervious support, preferably in sheet form, with a layer of polyvinyl alcohol penetrating deep into the pores or interstices of the support.

Another feature of this invention resides in the use of a plasticized polyvinyl alcohol capable of cross-linking to a support consisting of a cellulosic material.

A further feature of this invention is the preparation of a semi-permeable cellulosic spacer coated with a plasticized polyvinyl-alcohol layer so modified as to form molecular links with the cellulosic substrate penetrated thereby.

Other features, objects and advantages of this invention will be apparent from the detailed description of specific embodiments given with reference to the following examples and the sole figure of drawing showing a thermally sealed electrode bag according to this invention.

The pervious materials adapted to be treated by the process of this invention include both permeable and semi-permeable materials resistant to electrolytic attack such as regenerated cellulose, viskon, hydrophilic films cast from polystyrene emulsions, and various sheet materials made from woven or felted fibers or organic or inorganic origin, e.g. paper, nylon mesh or cotton felt.

A generally useful formulation for the impregnation of pervious materials to form the improved electrolyte-permeable diaphragms according to this invention is as follows:

Polyvinyl alcohol (at least 50% hydrolized)___ 5–20%
Plasticizer_____ 10–40%
Condensation agents_____ 1–5%
Water, q.s.

The mixture may be applied when warm to the pervious material and is then dried. Application of the mixture may be by any of the commonly used coating methods such as spraying, dipping, calendering or brushing and the drying may be accomplished by exposure to air or may be accelerated by the application of heat from radiant or conductive sources.

The proper choice of plasticizer is important. The plasticizer must be water-soluble as well as oxidation-resistant. For some purposes, bi- and tri-hydroxy glycols will be satisfactory. It has been observed, however, that none of the plasticizers in this group is sufficiently oxidation-resistant to meet the extremely stringent requirements of use in rechargeable alkaline batteries.

It has been discovered that it is possible to treat such plasticizers in a special fashion and thereby to achieve the requisite degree of oxidation resistance. This special treatment consists in a preliminary conditioning oxidation of the raw plasticizer. Such light oxidation may be achieved by treatment with hydrogen peroxide, e.g. in 3% solution for fifteen minutes, or potassium permanganate, e.g. in 1% solution for three minutes, or by subjecting the plasticizer for an extended period, e.g. for one hour, to a flow of hot air that has been passed over an electrical discharge lamp.

While no appreciable quantitative chemical change takes place within the plasticizer as a result of this treatment, such a degree of oxidation resistance is imparted as to make it suitable for use in battery-separator formulations. Among the plasticizers which may be used after the above treatment are any of the previously described di- and tri-hydroxy glycols, including glycerol, diethylene glycol, and the water-soluble polyethylene-glycol derivatives.

It has been found that when the pervious substrate consists of a cellulosic material, bonds of a superior strength may be produced by the proper modification of the polyvinyl-alcohol solution used for the treatment. Studies indicate that not only is there achieved a cross-linkage within the penetrating agent but additionally chemical bonding occurs across the interface between this agent and the substrate, i.e. between the cellulosic carrier and the polyvinyl-alcohol impregnant.

Among the cellulosic materials which form bonds linking the substrate with the impregnant of this invention there may be included the alkali-insoluble and swellable hydrophilic colloids, such as cellulose hydrates, cellulose ethers, cellulose esters, mixed cellulose esters and ethers, or substituted cellulose esters, such as cellulose xanthates.

For purposes of this disclosure, the formation of inter-molecular links between substrate and impregnant shall be called a cross-condensation. This cross-condensation is achieved by introducing into the polyvinyl-alcohol solution water-soluble esters of aliphatic straight-chain difunctional acids containing four to fourteen carbon atoms within the acid radical. There may be mentioned among these esters the several glutaric- and sebacic-acid esters which are commercially available under various trade names, including diethyl glutarate and dibutyl sebacate. This cross-condensation differs from the common cross-linking of polyvinyl alcohol with aldehydes, as disclosed in U.S. Patent No. 2,635,127, in that the presence of the modifying agent promotes chemical linking between the hydroxy groups of the cellulose radical and the hydroxy groups of the polyvinyl-alcohol molecule via the ester condensation. Reactions of this type cannot and do not take place between cellulose and polyvinyl alcohol in the presence of mere aldehydes.

The drawing shows an inter-electrode spacer 1 in the shape of a bag surrounding an electrode 2. The edges 1a and 1b of the bag are heat-sealed so that electrode 2 contained therein is completely enclosed. The bag consists of a sheet of cellulosic material, preferably regenerated cellulose, impregnated with polyvinyl alcohol in accordance with this invention.

The following examples are offered as illustrative of the modes of operation according to this invention but are not intended to limit the disclosure as to impregnating compositions or substrates.

Example I 100 parts of water
10 parts of 99% hydrolyzed polyvinyl alcohol
20 parts of diethylene glycol ($H_2O_2$-treated)
5 parts of dibutyl sebacate The above materials were warmed and mixed until completely dissolved. The warm solution was sprayed onto a sheet 0.08 mm. in thickness unplasticized regenerated cellulose (cellophane) and the resultant film was air-dried.

The above film was cut into separator elements and combined with zinc negatives and silver-peroxide positives to form cells. The cells so prepared yielded, with an alkaline electrolyte, an open-circuit voltage of approximately 1.85 volts. These cells were cycled through a series of charges and discharges and, when compared with control cells differing therefrom only by the use of untreated cellophane as the separator, were found to have improved cycle life and greater resistance to zinc penetration and oxidation.

Example II

The formula of Example I was applied by dipping to a sheet, 0.08 mm. in thickness, of cellulose acetate which was then air-dried. The resultant sheet was formed into separators for silver-zinc cells. These cells showed excellent cycle life. Control cells using separators of ordinary cellulose acetate had no appreciable cycle life.

Example III 100 parts of water
20 parts of 85% hydrolyzed polyvinyl alcohol
25 parts of propylene glycol (air-blown)
5 parts of diethyl glutaric acid.

All the above elements were combined and heated until complete solution was achieved. The resultant solution, while warm, was rolled onto a 0.08-mm. thick cellophane sheet, the excess impregnating solution was removed by a doctor blade and the resultant film was air-dried. Separators for silver-zinc batteries were prepared from the above film and batteries containing these separators were cycled. It was found that at least 25% improvement in cycle life was attained as compared to controls containing untreated cellophane.

Example IV

The formula of Example III was sprayed onto an 0.12-mm. thick sheet of absorbent paper and the excess was removed by passing the sheet between rollers. The resultant impregnated sheet was air-dried under standard infra-red bulbs. Separators for silver-zinc batteries were prepared from this sheet and batteries containing these separators were cycled. It was found that very great resistance to zinc penetration resulted from this treatment as compared to control cells using untreated paper.

Example V

Heat seals were prepared from the sheet materials of Examples I, II, III and IV. In each case, a heat seal was achieved having a strength equal to at least 50% of the strength of the base material when tested either dry or after 24 hours of soaking in 40% KOH equal to at least 50% of the strength of the base material. The materials heat-sealed at temperatures ranging between 120° C. and 250° C. without decomposition.

Example VI

The formula of Example I was applied, by rolling, to a 0.05-mm. thick sheet of silver cellulosate formed by the reaction of regenerated cellulose with a silver salt in the manner disclosed in U.S. Patent No. 2,785,106, dated March 12, 1957. The excess impregnating solution was removed by a doctor blade and the resultant film was air-dried. Separators for alkaline silver/zinc batteries were prepared from the above film and batteries containing these separators were cycled. It was found that at least 30% improvement in cycle life was attained with such separators as compared to controls containing untreated cellophane.

Separators according to this invention, e.g. as in the manner described in Example I, have been found suitable for use in batteries other than those of the alkaline type since they will withstand immersion in electrolyte as used in acidic batteries, such as solutions of 20% sulphuric acid.

We claim:

1. A process for preparing diaphragms for electrolytic systems which comprises the steps of cross-linking a pervious cellulosic sheet material with polyvinyl alcohol by impregnating said material with a solution of said polyvinyl alcohol in the presence of an organo-acidic condensation agent and drying the so impregnated material, said condensation agent being a dibasic carboxylic acid containing from 4 to 14 carbon atoms and capable of forming a water-soluble ester with the polyvinyl alcohol.

2. A process according to claim 1, wherein said polyvinyl alcohol is at least 50% hydrolyzed.

3. A process according to claim 1, wherein said pervious cellulosic material is a film of regenerated cellulose.

4. A process according to claim 1, wherein said solution includes a plasticizer chosen from the group which consists of monomeric and polymeric di- and tri-hydroxy glycols.

5. A process according to claim 4, comprising the further step of oxidizing said plasticizer prior to admixing it with said solution.

6. A process according to claim 1, wherein said condensation agent is selected from the group which consists of glutaric acid and sebacic acid.

7. A diaphragm for use in electrochemical cells comprising a continuous semi-permeable cross-linked polyvinyl alcohol-cellulosic membrane prepared in accordance with the process of claim 1.

8. A diaphragm for use in electrochemical cells comprising a continuous semi-permeable cross-linked polyvinyl alcohol-silver cellulosic membrane prepared in accordance with the process of claim 1.

9. A battery comprising a positive electrode, a negative electrode and an interelectrode separator therebetween, said interelectrode separator comprising a semi-permeable cross-linked polyvinyl-cellulosic membrane prepared in accordance with the process of claim 1.

References Cited in the file of this patent

UNITED STATES PATENTS

| | | |
|---|---|---|
| 2,486,399 | Gagarine | Nov. 1, 1949 |
| 2,635,127 | Yardney | Apr. 14, 1953 |
| 2,729,694 | Ellis | Jan. 3, 1956 |
| 2,889,192 | D'Adamo | June 2, 1959 |

FOREIGN PATENTS

| | | |
|---|---|---|
| 165,901 | Australia | Nov. 7, 1955 |
| 166,764 | Australia | Feb. 3, 1956 |